United States Patent
Narita et al.

(12)

(10) Patent No.: US 6,177,745 B1
(45) Date of Patent: *Jan. 23, 2001

(54) PERMANENT MAGNET ROTOR TYPE ELECTRIC MOTOR

(75) Inventors: Kenji Narita; Takashi Suzuki; Hiroyuki Okudera; Yuji Kawai; Yuji Souma; Koji Kawanishi; Yoshichika Fukuda, all of Kawasaki (JP)

(73) Assignee: Fujitsu General Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/158,114

(22) Filed: Sep. 22, 1998

(30) Foreign Application Priority Data

Sep. 26, 1997 (JP) ........................................ 9-279961

(51) Int. Cl.[7] ............................ H02K 21/12; H02K 1/00; H02K 1/22
(52) U.S. Cl. ........................ 310/156; 310/216; 310/261
(58) Field of Search ........................ 310/156, 216, 310/261, 262, 263, 264, 265, 266, 267, 268, 269, 154, 254, 258, 259

(56) References Cited

U.S. PATENT DOCUMENTS

| 2,939,025 | * | 5/1960 | Williford | 310/156 |
| 4,127,786 | * | 11/1978 | Volkrodt | 310/156 |
| 4,217,508 | * | 8/1980 | Uzuka | 310/46 |
| 4,405,873 | * | 9/1983 | Nondahl | 310/156 |
| 4,727,273 | * | 2/1988 | Tanaka | 310/154 |
| 4,794,291 | * | 12/1988 | Abukawa et al. | 310/154 |
| 4,922,152 | * | 5/1990 | Gleghorn et al. | 310/156 |
| 4,924,130 | * | 5/1990 | Fratta | 310/261 |
| 5,097,166 | * | 3/1992 | Mikulic | 310/156 |
| 5,206,556 | * | 4/1993 | Hayakawa | 310/154 |
| 5,510,662 | * | 4/1996 | Tanimoto et al. | 310/156 |
| 5,684,352 | * | 11/1997 | Mita et al. | 310/156 |
| 6,025,667 | * | 2/2000 | Narita et al. | 310/156 |

\* cited by examiner

*Primary Examiner*—Thomas M. Dougherty
*Assistant Examiner*—Dang Dinh Le
(74) *Attorney, Agent, or Firm*—Kanesaka & Takeuchi

(57) ABSTRACT

In a permanent magnet rotor type electric motor in which a permanent magnet is embedded in a rotor, a permanent magnet used for a magnetic pole of one polarity in a rotor core and another permanent magnet used for a magnetic pole of the other polarity have different configurations and materials from each other, so that the selecting range for the magnetic flux density and the reluctance torque of the permanent magnet rotor type electric motor can be increased.

5 Claims, 14 Drawing Sheets

PERMANENT MAGNET ROTOR TYPE ELECTRIC MOTOR

BACKGROUND OF THE INVENTION

1. Field of the Invention

This invention relates to an electric motor having a permanent magnet in a rotor, such as Brushless DC motor or the like and, more specifically, to an electric motor in which the magnetic flux density, a reluctance torque and so on can be selectively established, appropriate for a compressor of an air conditioner for example.

2. Description of the Related Art

In the electric motor of the type as described above, a permanent magnet is embedded in a core of an inner rotor of the electric motor, an example thereof being shown in FIG. 26 which is a plan view showing the inside of this electric motor from a plane orthogonal to the axis of rotation.

In the drawing a rotor core 2 is disposed inside a stator core 1, for example, having 24 slots, in which a field magnet rotates. In this case, the number of poles of the electric motor is four, therefore four permanent magnets 3 are arranged in the rotor core 2 in accordance with the number of poles.

The permanent magnets 3 are each formed to be a band plate shape of rectangular cross-section, and are arranged to have equal spaces on the outer circle side of the rotor core 2 in the circumferential direction, to be embedded inside the rotor core 2 along a direction perpendicular to paper of FIG. 26.

Between the adjacent permanent magnets 3, holes 4 as a flux barrier for avoiding short-circuiting and leaking of the magnetic flux in between the adjacent permanent magnets 3, are formed. In this example, the hole 4 is represented as a triangle hole and disposed at each end of the permanent magnet 3. In the center of the rotor core 2, a center hole 5 is formed to pass a rotating shaft (not shown) therethrough.

In this point, when the magnetic flux distribution in a gap portion (between teeth of the stator core 1 and the permanent magnets 3) caused by each permanent magnet 3 is in a sine wave state, torque T of the electric motor is given as $T=Pn\{\Phi a \cdot Ia \cdot \cos \beta - 0.5(Ld-Lq) \cdot I2 \cdot \sin 2\beta\}$, where T is an output torque, $\Phi a$ is an armature flux-linkage caused by the permanent magnet 3 on the d and q coordinate axes, Ld and Lq are the d-axis inductance and the q-axis inductance respectively, Ia is amplitude of an armature current on the d and q coordinate axes, $\beta$ is a lead angle of the armature current from the q axis on the d and q coordinate axes, and Pn is a pole-logarithm.

In the above expression, the first term expresses a magnet torque generated by the permanent magnets 3 and the second term express a reluctance torque generated by the difference between the d-axis inductance and the q-axis inductance. Refer to a treatise published in T. IEE Japan, vol. 117-D, No. 8. 1997 for further detail.

Typically, a ferrite magnet and a rare-earth magnet are used for the permanent magnet 3 employed in the aforementioned type electric motor.

The ferrite magnet is low cost and available for forming the permanent magnets in various configurations due to it's ease of shaping, but the magnet flux density is low, therefore hindering the reduction in size of the rotor core.

On the other hand, the rare-earth magnet has a high magnet-flux density, so that the reduction in size of the rotor core can be easy, but the configuration of the permanent magnet is limited by the difficulties of shaping thereof. In addition, the rare-earth magnet has a higher cost than the ferrite magnet.

Since both the ferrite magnet and rare-earth magnet have the pros and cons as explained above, conventionally for reasons of the use of a motor and/or a cost, either the ferrite magnet or the rare-earth magnet is chosen for all permanent magnets of magnetic poles.

In addition to the cost aspect, since all permanent magnets forming the magnet poles have the same shape as shown in FIG. 26, a range for determining the magnetic flux density, the reluctance torque and the like is narrow, thereby causing problems in designing the electric motor. As to the configuration of the permanent magnet, for example, an inverted arc shaped permanent magnet is referred to in the aforementioned treatise, but still in this case, all permanent magnets used for all poles have the same shapes.

For example, when all magnetic poles are formed of the same rare-earth magnet, the magnetic flux density is excessively high and also the cos higher. When all magnetic poles are formed of the same ferrite magnet, despite the low costs, the magnetic flux density is insufficient, resulting in not obtaining of a sufficient motor torque.

The shapes of the permanent magnets of all magnetic poles are the same, whereby the reluctance torque is determined on one ground.

As described hereinbefore, conventionally, proper permanent magnets having an intermediate state between the ferrite magnets and the rare-earth magnets are troublesome to obtain, that is to say it is difficult to select the required magnetic flux density, reluctance torque and cost.

SUMMARY OF THE INVENTION

The present invention has been made for resolving the aforementioned disadvantages. It is an object of the present invention to provide a permanent magnet rotor type electric motor capable of selectively determining a magnetic flux density and a reluctance torque and having a reasonable cost.

According to the present invention, a permanent magnet rotor type electric motor has a rotor core with a permanent magnet at each magnetic pole portion and is disposed in a stator core generating a rotation magnetic field. A second permanent magnet, has a different shape and material from a first permanent magnet, for a magnetic pole of one polarity in the rotor core with respect to the first permanent magnet used for a magnetic pole of the other polarity.

In the present invention, it is preferable that the first permanent magnets be formed in the same configurations and of the same materials, and the second permanent magnets be formed in the same configurations and of the same materials. However, a plurality of the first permanent magnets can be formed in a different configuration from each other and of the same materials or formed in the same configurations and of different materials from each other, and/or a plurality of the second permanent magnets can be also formed in a different configuration from each other and of the same materials or formed in the same configurations and of different materials from each other. So, the above structure should be included in the scope of the present invention.

As described above, as an example, one of the permanent magnets is made of a rare-earth magnet and the other is made of a ferrite magnet, thereby easily obtaining the magnetic flux density and the reluctance torque in an intermediate state of a conventional rotor core in which all permanent magnets are formed in the same configurations and of the same materials. In addition, the production cost can be reduced further than in the case where the rare-earth magnet is used for all permanent magnets, as another example.

The present invention includes the following various structures, and thereby also attaining the aforementioned object.

As the first structure, the first permanent magnets is formed of a band plate having rectangular cross-section, and a pair or a plurality of the first permanent magnets is arranged to be parallel to each other along a direction perpendicular to a diameter line of the rotor core in the vicinity of the outer circumference of the rotor core, and the second permanent magnet is formed of a band plate having arc-shaped cross-section, and each of a pair or a plurality of the second permanent magnets is arranged between the first permanent magnets.

In the above first structure, the second permanent magnet might be disposed so that the convex face thereof having arc-shaped cross-section is oriented toward the center of the rotor core. Alternatively, the second permanent magnet might, as well, be disposed so that the convex face thereof having arc-shaped cross-section is oriented toward the outer circumference of the rotor core. Alternatively, each of the second permanent magnets may have a plurality of magnet pieces each of which is formed of a band plate having arc-shaped cross-section and concentrically arranged, and has a different length of the arc portion from each other.

As the second structure, the first permanent magnet is formed of a band plate having rectangular cross-section and a pair or a plurality of the first permanent magnets is arranged to be parallel to each other along a direction perpendicular to a diameter line of the rotor core in the vicinity of the outer circumference of the rotor core; and the second permanent magnet has two magnet pieces each of which is formed of a band plate having rectangular cross-section, and the two magnet pieces are arranged between the first permanent magnets at a certain angle to approach each other toward the center of the rotor core.

As the third structure, each of the first permanent magnets has two magnet pieces each of which is formed of a band plate having rectangular cross-section, and the two magnet pieces are arranged at a certain angle to approach each other toward the center of the rotor core; and the second permanent magnet is formed of a band plate having arc-shaped cross-section and arranged between the first permanent magnets.

As the fourth structure, the first permanent magnet is formed of a band plate having rectangular cross-section and a pair or a plurality of the first permanent magnets is arranged to be parallel to each other along a direction perpendicular to a diameter line of the rotor core in the vicinity of the outer circumference of the rotor core; and the second permanent magnet is formed of a plate-shaped body of fan cross-section and each of a pair or a plurality of the second permanent magnets is arranged between the first permanent magnets.

As the fifth structure, each of the first permanent magnets has two magnet pieces each of which is formed of a band plate having rectangular cross-section, and the two magnet pieces are arranged at a certain angle to approach each other toward the center of the rotor core; and the second permanent magnet is formed of a plate-shaped body having arc-shaped cross-section and arranged between the first permanent magnets.

As the sixth structure, the first permanent magnet is formed of a band plate having rectangular cross-section and a pair or a plurality of the first permanent magnets is arranged to be parallel to each other along a direction perpendicular to a diameter line of the rotor core in the vicinity of the inner circumference of the rotor core, and long holes for flux barrier are formed from both ends of each of the first permanent magnets toward the outer circumference of the rotor core; and the second permanent magnet is formed of a band plate having arc-shaped cross-section and each of a pair or a plurality of the second permanent magnets is arranged between the first permanent magnets.

As the seventh structure, the first permanent magnet is formed of a band plate having rectangular cross-section and a pair or a plurality of the first permanent magnets is arranged to be parallel to each other along a direction perpendicular to a diameter line of the rotor core in the vicinity of the inner circumference of the rotor core, and long holes for flux barrier are formed from both ends of each of the first permanent magnets toward the outer circumference of the rotor core; and the second permanent magnet is formed of a plate-shaped body having arc-shaped cross-section and each of a pair or a plurality of the second permanent magnets is arranged between the first permanent magnets.

As the eighth structure, the first permanent magnet is formed of a band plate having rectangular cross-section and a pair or a plurality of the first permanent magnets is arranged to be parallel to each other along a direction perpendicular to a diameter line of the rotor core in the vicinity of the inner circumference of the rotor core, and long holes for flux barrier are formed from both ends of each of the first permanent magnets toward the outer circumference of the rotor core; and the second permanent magnet has two magnet pieces each of which is formed of a band plate having rectangular cross-section, and the two magnet pieces are arranged between the first permanent magnets to have a certain angle at which the magnet pieces approach each other toward the center of the rotor core.

As the ninth structure, the first permanent magnet and the second permanent magnet each have two magnet pieces each of which is formed of a band plate having rectangular cross-section, and the two magnet pieces are arranged in each magnetic pole portion at a certain angle to approach each other toward the center of the rotor core.

In the aforementioned structures, it is desirable that a rare-earth magnet is used for any one of the first permanent magnet and the second permanent magnet, and a ferrite magnet is used for the other. The rare-earth magnet and the ferrite magnet are general and available.

In the present invention, it is preferable that the rotor core is formed of a laminated body of a magnetic steel plate stamped out through a pressing process. In this case, it is desirable in terms of manufacturing that holes for inserting the permanent magnet are formed in the laminated body of the magnetic steel plates in the pressing process so that the first permanent magnets and the second permanent magnets are embedded and polarized in the holes for inserting the permanent magnet. Thereby, a conventional producing processes can continuously be employed, so that the production cost should not be increased.

The present invention is appropriate for a brushless DC motor used for driving a compressor in an air conditioner, whereby the performance of the air conditioner should be increased.

BRIEF DESCRIPTION OF THE DRAWINGS

The present invention will be described further hereinafter, by way of example only, with reference to the accompanying drawings in which.

DETAILED DESCRIPTION OF THE PREFERRED EMBODIMENT(S)

Figure 1:
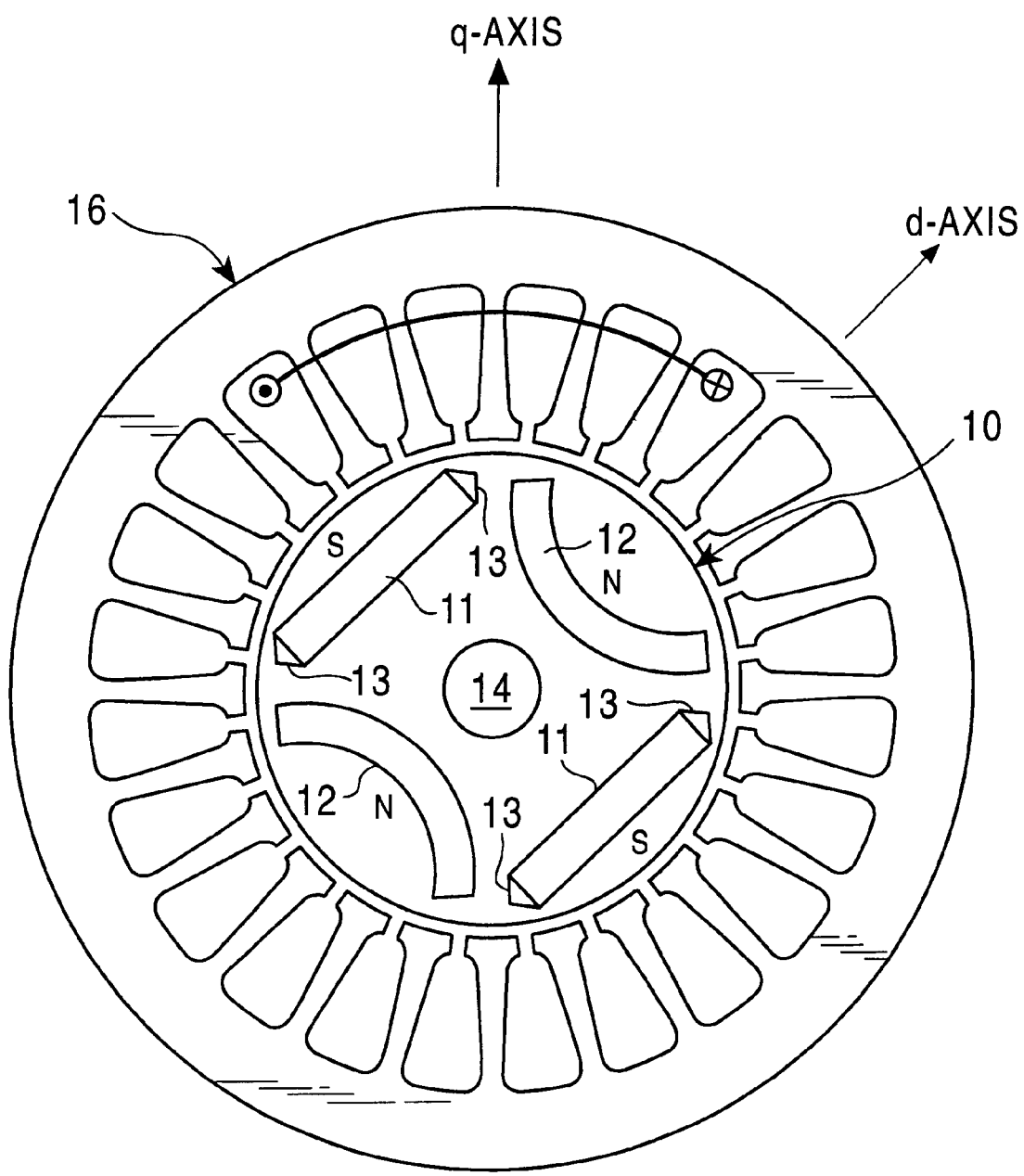
FIG. 1 is a diagrammatic plan view showing a structure of a permanent magnet rotor type electric motor as a master embodiment according to the present invention from a plan perpendicular to the axis of rotation thereof.

In the present invention, the magnetic flux density and the reluctance torque can selectively be re-determined by changing materials and shapes of a permanent magnet used for a magnetic pole in different magnetic poles, of which the master embodiment is shown in FIG. 1. The explanation as to a stator core 16 generating a magnetic field of rotation will be omitted since the stator core 16 must be similar to the stator core 1 shown in FIG. 26 and explained hereinbefore in the performance of the present invention.

In a rotor core 10 of a permanent magnet rotor type electric motor according to the embodiment, a first permanent magnet 11 made of a rare-earth magnet is used for one magnetic pole (e.g., the south pole), and a second permanent magnet 12 made of a ferrite magnet is used for the other pole as the north pole. That is to say that permanent magnets made of different materials are respectively used in the south pole and in the north pole.

The first permanent magnet 11 is shaped in a band plate of rectangular cross-section. In the embodiment, a pair of the first permanent magnets 11 is arranged in parallel along a direction perpendicular to a diametric line of the rotor core 10 in the vicinity of the outer circumferential edge of the rotor core 10.

On the other hand, the second permanent magnet 12 is shaped in a band plate of arc-shaped cross-section, and a pair of the second permanent magnets 12 is each arranged between the first permanent magnets 11. In the embodiment, the second permanent magnet 12 has an inverted arc shape of which the convex face is oriented toward the center of the rotor core 10.

As described above, in the embodiment, the first permanent magnet 11 and the second permanent magnet 12 have a different shape from each other.

Note that a hole 13 for a flux barrier to avoid short-circuiting and leaking of the magnetic flux is formed at each end of the first permanent magnet 11. Additionally, a center hole 14 for passing a rotating shaft (not shown) is opened on the axis line of the rotor core 10.

According to the present invention, the magnetic flux density of the rotor core 10 results in an intermediate state between the magnetic flux density of a rotor core where all the first and second permanent magnets 11 and 12 are made of the rare-earth magnet, and the magnetic flux density of a rotor core where all the first and second permanent magnets 11 and 12 are made of the ferrite magnet. This is due to the fact that the magnetic flux density of the rare-earth magnet is high but the magnetic flux density of the ferrite magnet is lower than that of the rare-earth magnet.

Figure 26:
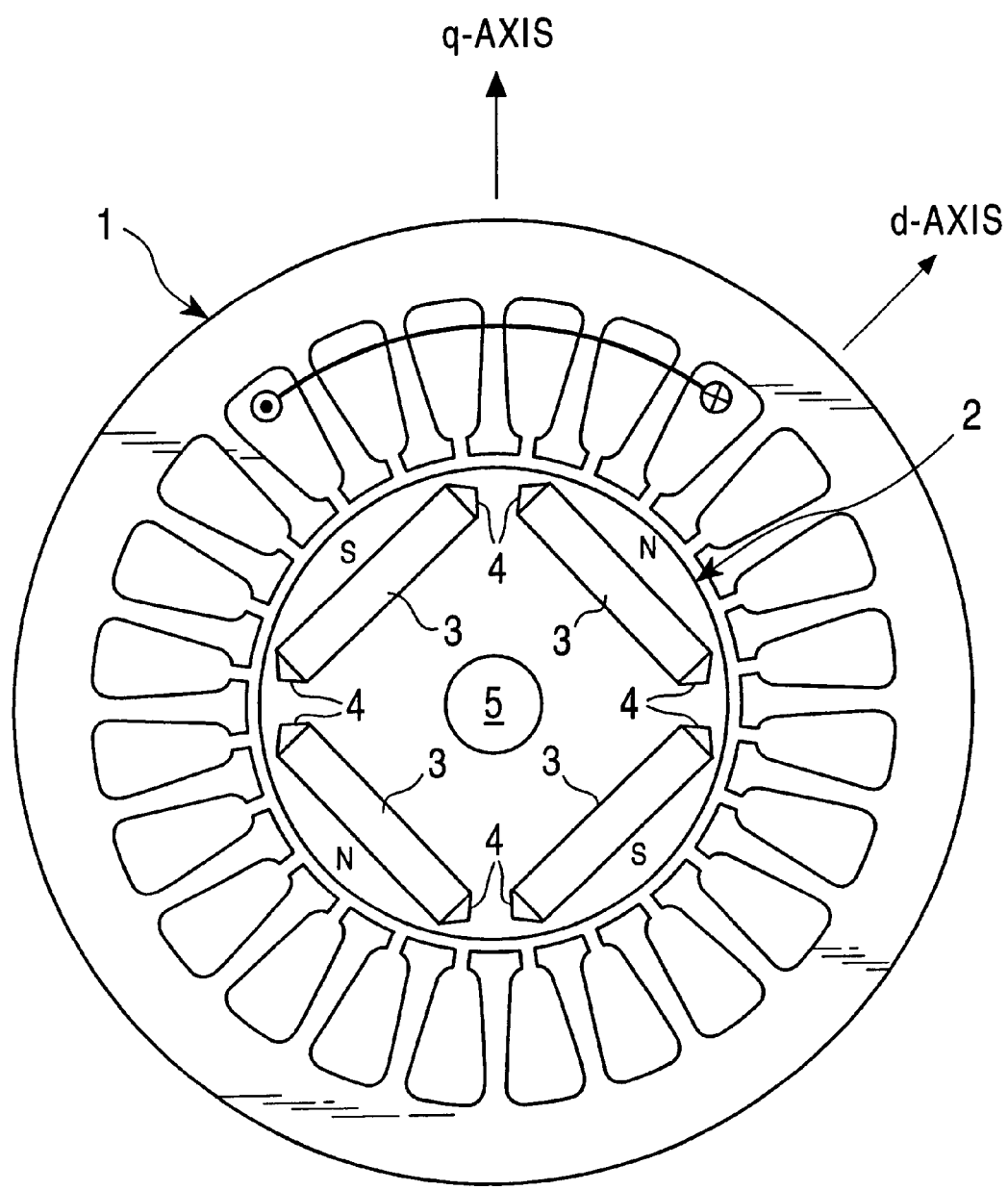
FIG. 26 is a diagrammatic plan view showing the structure of a conventional permanent magnet rotor type electric motor, which is similar to FIG. 1.

Similarly, concerning the cost, half of the permanent magnets is costly rare-earth magnet and the other half is low-cost ferrite magnet, so that the cost of the rotor core 10 is at the intermediate point between the costs in the uses of the rare-earth magnet and the ferrite magnet.

Where the reluctance torque is concerned, since the second permanent magnet 12 has an arc shape, the q-axis inductance is large, therefore a difference between the q-axis inductance and the d-axis inductance (parameter of the reluctance torque) is increased, further than, for example, the conventional example explained in FIG. 26.

As compared to the rotor core in which all permanent magnets are made of either the rare-earth magnet or the ferrite magnet, the rotor core 10 having the intermediate state of the magnetic flux density and the reluctance torque can be conveniently obtained in this way.

Moreover, the cost of rotor core 10 is lower than that of a rotor core using the permanent magnets made of the rare-earth magnet only. It should be mentioned that, in the embodiment, the two materials of the rare-earth magnet and the ferrite magnet are respectively used for the first and the second permanent magnets 11 and 12, but other magnet materials may be used. And also the rare-earth magnet may be used for the permanent magnet 11 as the south pole and the ferrite magnet may be used for the permanent magnet 12 as the north pole, or vice-versa.

Figure 2:
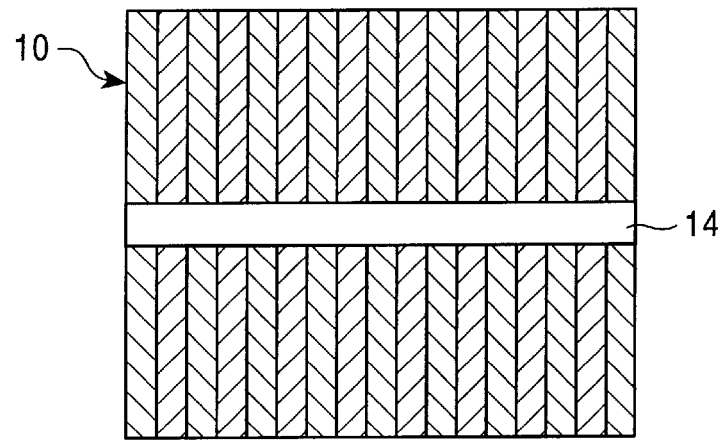
FIG. 2 is a diagrammatic vertical sectional view along the axis of rotation of a rotor core shown in the above embodiment of FIG. 1.

As shown in FIG. 2, the rotor core 10 is produced through the process in which magnetic steel plates are mechanically laminated inside a die (not shown) after being stamped out in the same shape by pressing. Preferably, concurrently with the pressing process, spaces (holes) for accommodating the permanent magnets 11 and 12 should be opened in all magnetic steel plates, and all permanent magnets 11 and 12 should be embedded and polarized inside the spaces. It is advisable that the hole 13 for the flux barrier be opened during the above processes.

According to the above description, since the rotor core 10 is produced through the conventional pressing process, the production-efficiency will not be reduced, and the production cost will not be increased either.

In regard to the position of each end of the permanent magnets 11 and 12 and each position, forming the hole 13 for the flux barrier, those skilled in the art will determine positions of obtaining sufficient strength for enduring centrifugal force during the rotation of the rotor core 10.

By applying the rotor core 10 to a brushless DC motor for a compressor of an air conditioner, the performance of the air conditioner can be improved (i.e., enhancement of the operating efficiency, reduction in noise and vibrations).

Figure 3:
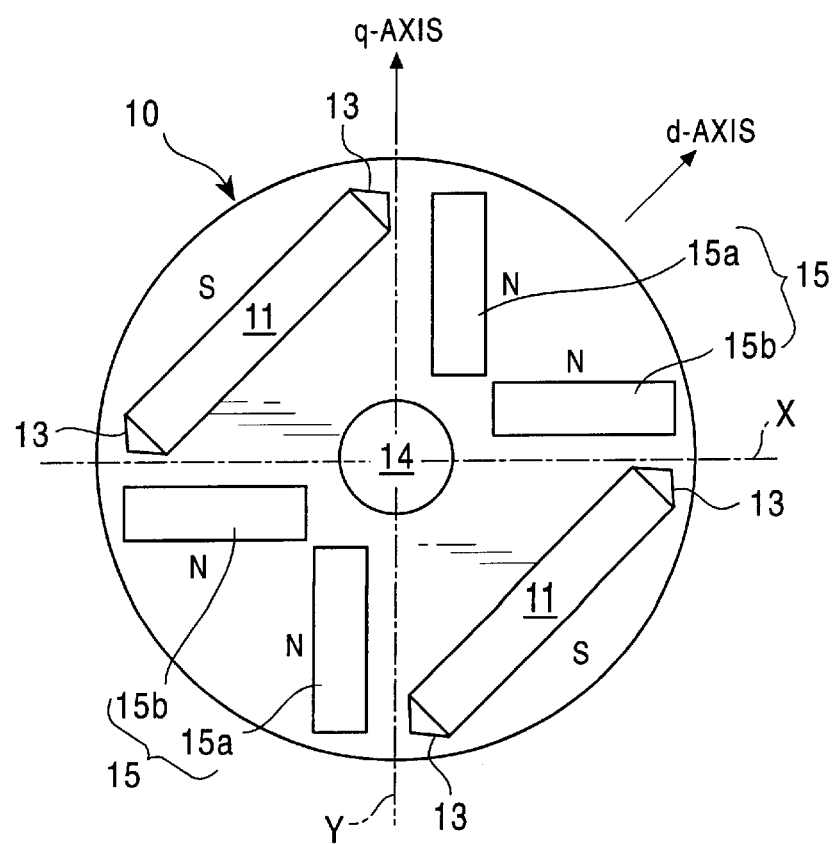
FIG. 3 to FIG. 25 are diagrammatic plane views respectively showing modifications of the above rotor core.
Figure 4:
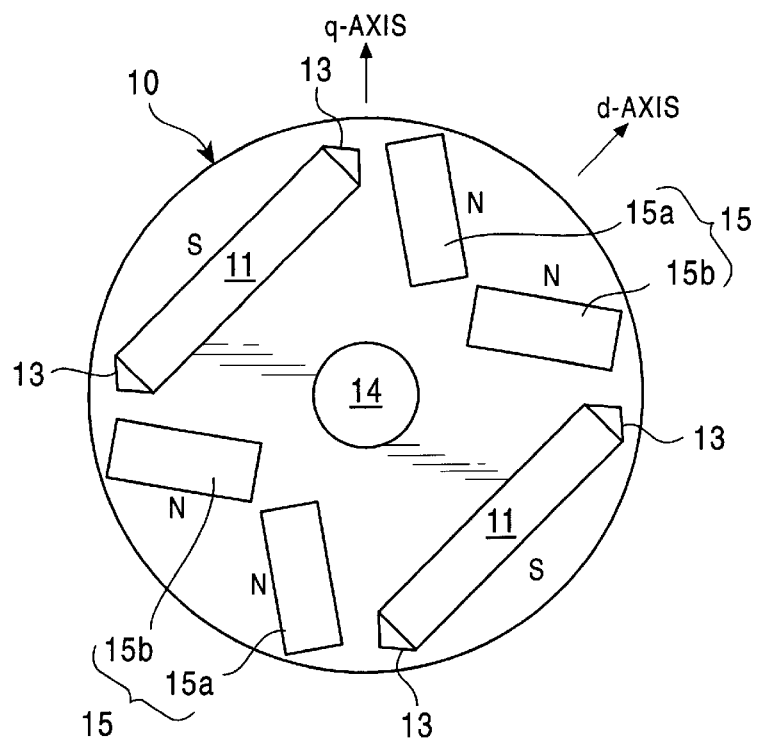

The difference between the q-axis inductance and the d-axis inductance can be further increased by modifying the aforementioned rotor core 10 as shown in FIG. 3 and FIG. 4.

Figure 5:
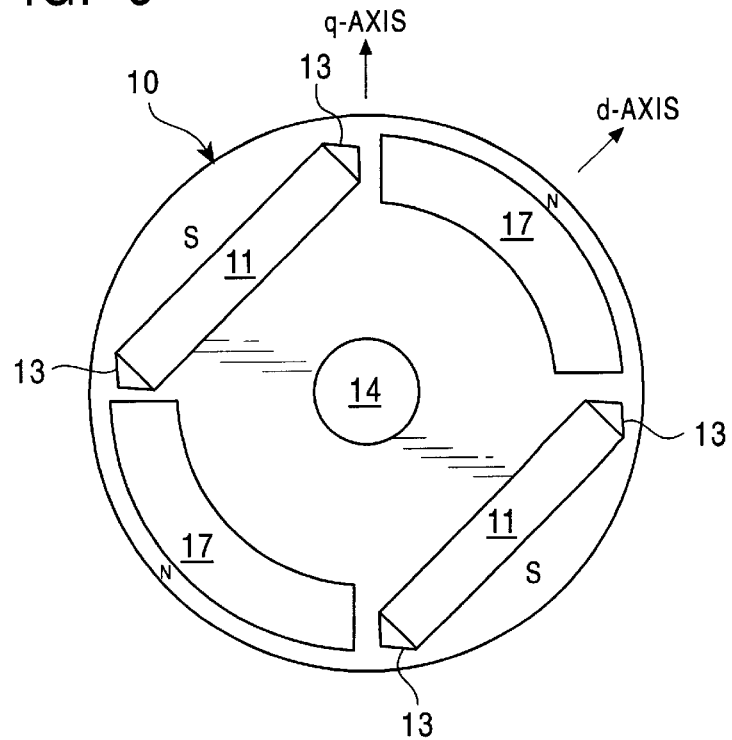
Figure 6:
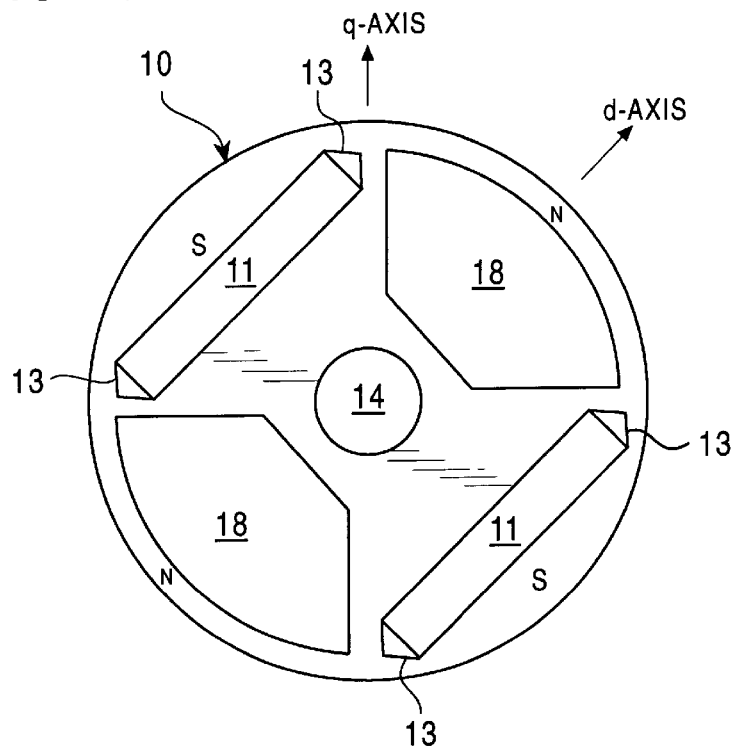

In order to increase the magnetic flux density of the ferrite magnet used for one magnetic pole, the structures as shown in FIG. 5 and FIG. 6 are appropriate.

Figure 7:
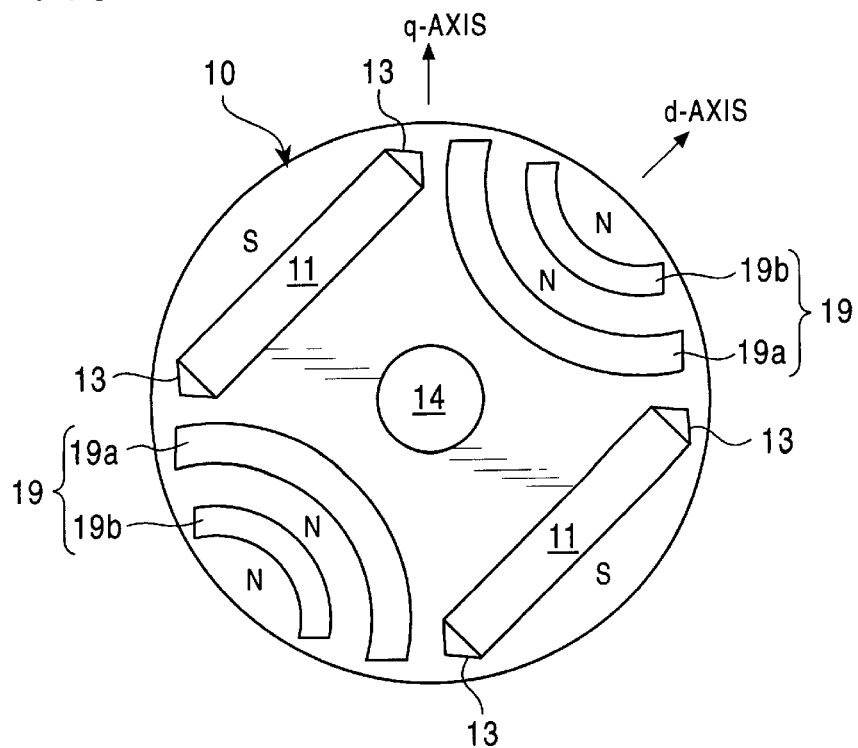

Also, the structure of a rotor core shown in FIG. 7 can be exemplified to increase the magnetic flux density further than that of the structures shown in FIG. 3 and FIG. 4 and also to increase the reluctance torque.

Explaining the above modifications, in respect to the modification shown in FIG. 3, the first permanent magnet 11 of one magnetic pole (the south pole) is the same as that of the embodiment in FIG. 1, but a second permanent magnet 15 of the other magnetic pole (the north pole) has two magnet pieces 15a and 15b. Both the magnet pieces 15a and 15b are made of the ferrite magnet having rectangular cross-section. In FIG. 3, where the vertical center line along one q axis between the magnetic poles in the rotor core 10 is Y, and the horizontal center line along the other q axis is X, the magnet piece 15a is arranged to be parallel to the vertical center line Y and the magnet piece 15b is arranged to be parallel to the horizontal center line X. In other words, the magnet pieces 15a and 15b are arranged at an angle so that the adjacent ends of the magnet pieces 15a and 15b approach each other toward the center of the rotor core 10, whereby the difference between the q-axis inductance and the d-axis inductance can be further increased.

In the structure of FIG. 3, on the ground that the magnet pieces 15a and 15b are respectively arranged to parallel to the center lines Y and X, an arranging angle which is formed between the adjacent ends of the magnet pieces 15a and 15b is 90 degrees. However, as shown in FIG. 4, the arranging angle between the adjacent ends of the magnet pieces 15a and 15b may be defined as any specific angle so that the magnet pieces 15a and 15b can be oriented to approach each other toward the center of the rotor core 10.

In the rotor core 10 shown in FIG. 5, the first permanent magnet 11 of one magnetic pole (the south pole) is the same as that of the embodiment of FIG. 1, and a second permanent magnet 17 of the other magnetic pole (the north pole) is made of the ferrite magnet of arc-shaped cross-section. Nevertheless, in this case, the second permanent magnet 17 is disposed to orient the convex face thereof toward the outer circumference of the rotor core 10, in contrast to the embodiment as shown in FIG. 1. According to these arrangements, the plate thickness of the second permanent magnet 17 can be thicker than that of the embodiment shown in FIG. 1, so that the magnetic flux density is increased.

In the rotor core 10 shown in FIG. 6, the first permanent magnet 11 of one magnetic pole (the south pole) is the same as that of the embodiment in FIG. 1, but a second permanent magnet 18 is made of the ferrite magnet having fan-shaped cross-section, of which the outer circumferential side is along the outer circumference of the rotor core 10 and which is embedded inside the rotor core 10. According to this structure, similar to the structure shown in FIG. 5, the second permanent magnet 18 is large enough in size to increase the magnetic flux density further than that of the embodiment of FIG. 1.

As another modification, on the rotor core 10 shown in FIG. 7, the first permanent magnet 11 of one magnetic pole (the south pole) is the same as that of the embodiment in FIG. 1, but a second permanent magnet 19 has two magnet pieces 19a and 19b each of which is made of the ferrite magnet of arc-shaped cross-section. The magnet pieces 19a and 19b have a different length of the arc portion from each other. In the modification, the magnet piece 19a having the longer arc portion is disposed closer to the inner circumference of the rotor core 10, and the convex face thereof is oriented toward the center of the rotor core 10. On the other hand, the magnet piece 19b having the shorter arc portion is disposed closer to the outer circumference of the rotor core 10 and concentric with the magnet piece 19a. As a result of designing the second permanent magnet 19 in a two-stage structure of the magnet pieces 19a and 19b as described above, the magnetic flux density is higher than that of the embodiment in FIG. 1, and the q-axis inductance is increased by the two-stage structure of the magnet pieces 19a and 19b, so that the reluctance torque can be increased.

The modifications described hereinbefore are as to the second permanent magnet used as the north pole. Modifications for the first permanent magnet used as the south pole will be now explained below with reference to FIG. 8 to FIG. 13. By these modifications, the magnetic flux density and the reluctance torque can also be re-determined.

In each modification, a first permanent magnet used as the south pole is represented by reference numeral 20. The first permanent magnet 20 has two magnet pieces 20a and 20b each of which is made of the rare-earth magnet of rectangular cross-section. In all cases shown in FIG. 8 to FIG. 13, similar to the magnet pieces 15a and 15b of the second permanent magnet 15 explained hereinbefore in FIG. 3 and FIG. 4, the magnet pieces 20a and 20b are arranged to approach each other toward the center of the rotor core 10 at an arranging angle between the adjacent end portions thereof as a specified angle.

Figure 8:
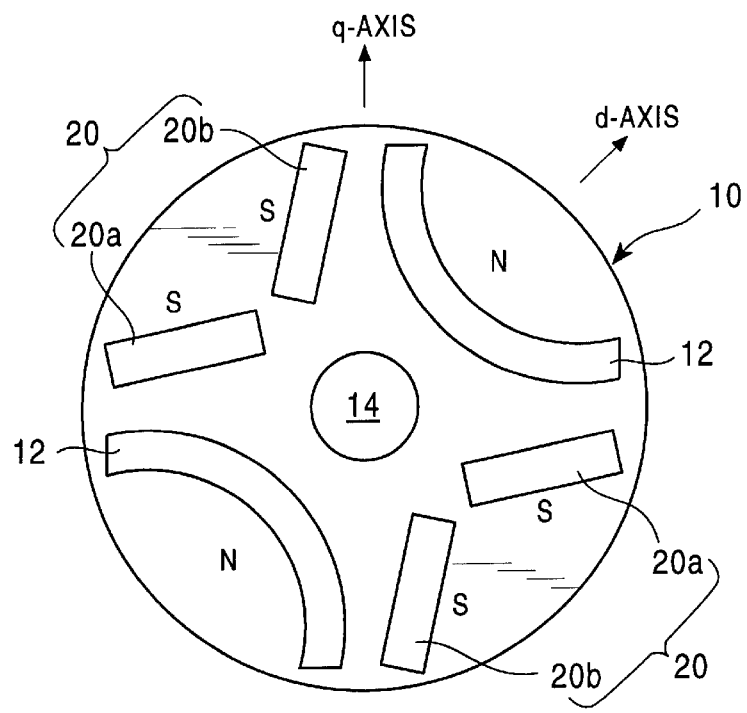
Figure 9:
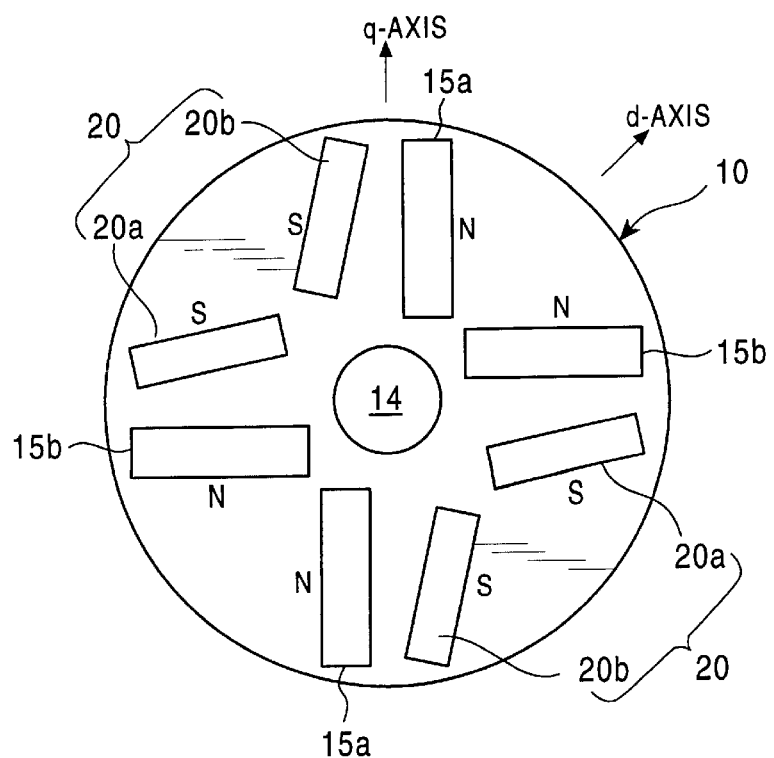
Figure 10:
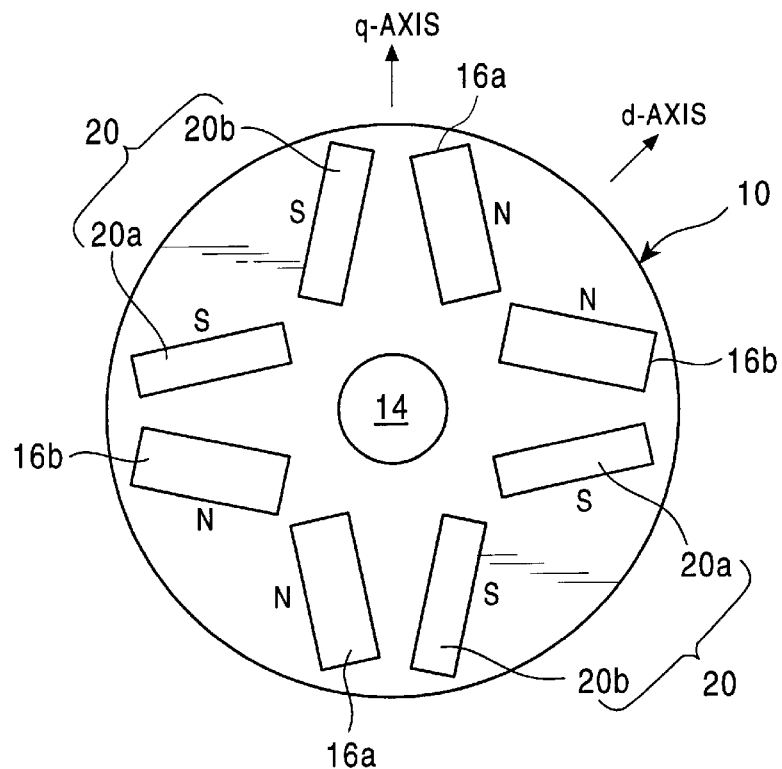
Figure 11:
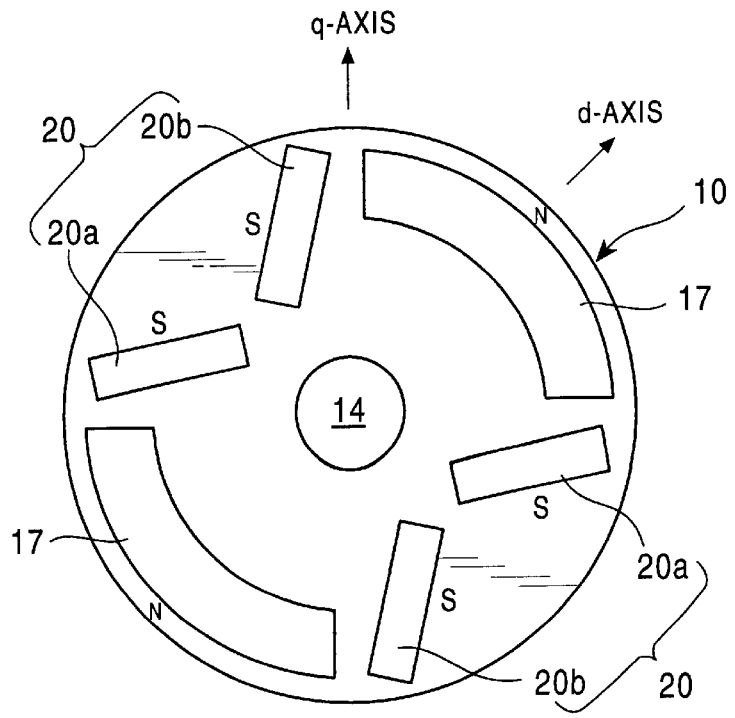
Figure 12:
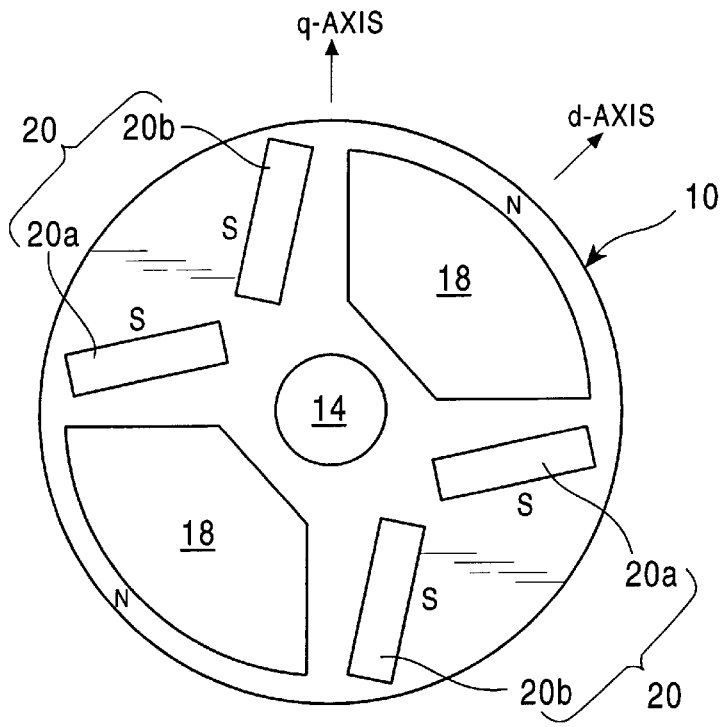
Figure 13:
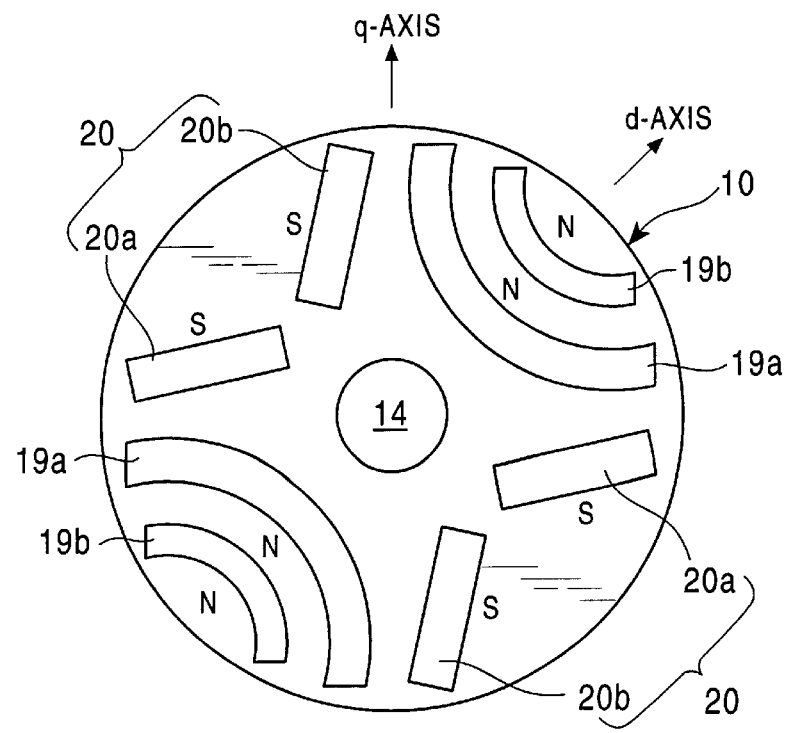

In other words, FIG. 8 shows a modification in which the magnet pieces 20a and 20b of the first permanent magnet 20 are used instead of the first permanent magnet 11 of the embodiment shown in FIG. 1. FIG. 9 shows a modification in which the magnet pieces 20a and 20b of the first permanent magnet 20 are used instead of the first permanent magnet 11 of the modification shown in FIG. 3. FIG. 10 shows a modification in which the magnet pieces 20a and 20b of the first permanent magnet 20 are used instead of the first permanent magnet 11 of the modification shown in FIG. 4. FIG. 11 shows a modification in which the magnet pieces 20a and 20b of the first permanent magnet 20 are used instead of the first permanent magnet 11 of the modification shown in FIG. 5. FIG. 12 shows a modification in which the magnet pieces 20a and 20b of the first permanent magnet 20 are used instead of the first permanent magnet 11 of the modification shown in FIG. 6. FIG. 13 shows a modification in which the magnet pieces 20a and 20b of the first permanent magnet 20 are used instead of the first permanent magnet 11 of the modification shown in FIG. 7.

Where the rotor core 10 shown in FIG. 8 is considered, its magnetic flux density does not differ much from that of the rotor core 10 in FIG. 1, but the q-axis inductance is larger so that the reluctance torque be increased. In addition, since the first permanent magnet 20 as the south pole is composed of two magnet pieces 20a and 20b, it is more convenient to obtain the magnet flux density required.

Similarly, each rotor core 10 shown in FIG. 9 to FIG. 13 benefits from the effects resulting from the modifying of the first permanent magnet as well as the effects resulting from the modifying of the second permanent magnet.

In each aforementioned modification shown in FIG. 8 to FIG. 13, the first permanent magnet 20 composed of two magnet pieces 20a and 20b is used for the south pole. FIG. 14 to FIG. 19 show further modifications of the above-modified first permanent magnets. Incidentally, FIG. 14 to FIG. 19 correspond to FIG. 8 to FIG. 13 respectively.

In the modifications, a first permanent magnet 21 used for the south pole is also made of the rare-earth magnet having rectangular cross-section. The first permanent magnet 21 is disposed in the vicinity of the center hole 14 of the rotor core 10, and a pair of the first permanent magnets 21 is arranged in parallel along the direction perpendicular to a diameter line of the rotor core 10. In the modifications shown in FIG. 14 to FIG. 19, the second permanent magnet as the other magnetic pole (the north pole) is the same as that shown in FIG. 8 to FIG. 13.

At both end portions of the first permanent magnet 21, holes 22 and 22 for the flux barrier extending toward the outer circumference of the rotor core 10, are formed. In each modification shown in FIG. 14 to FIG. 19, the holes 22 and 22 for the flux barrier have an angle at which the holes 22 and 22 are separated from each other as extending toward the circumference of the rotor core 10.

Figure 14:
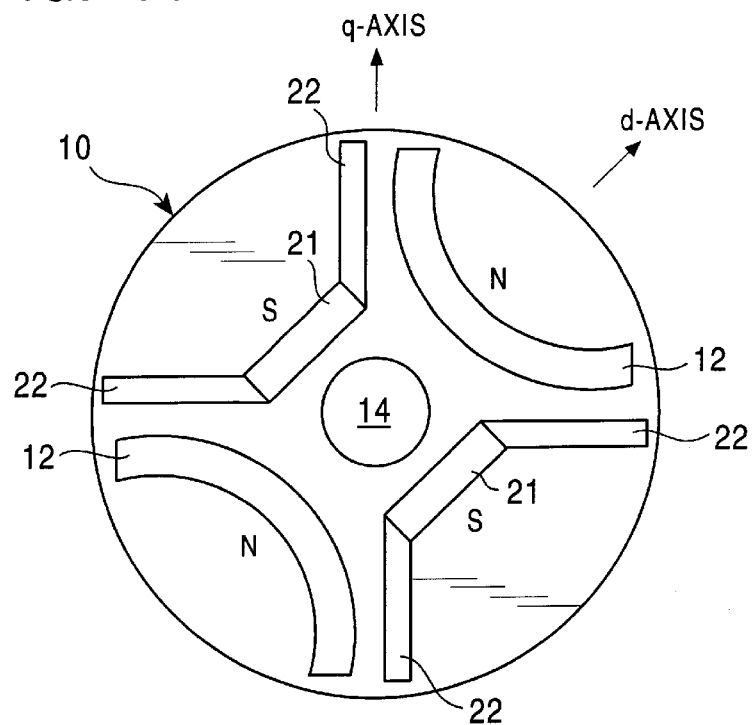
Figure 15:
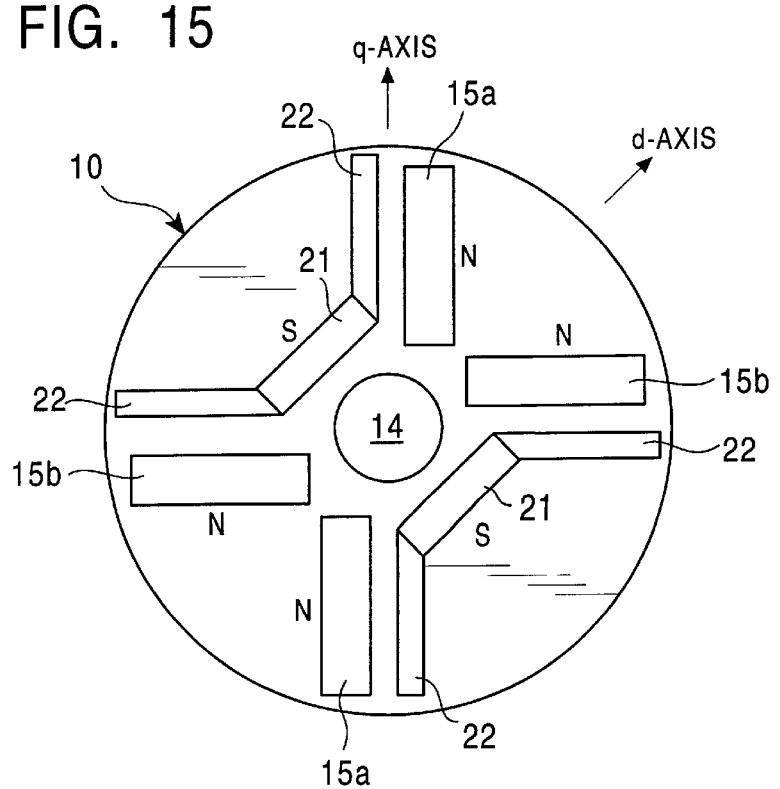
Figure 16:
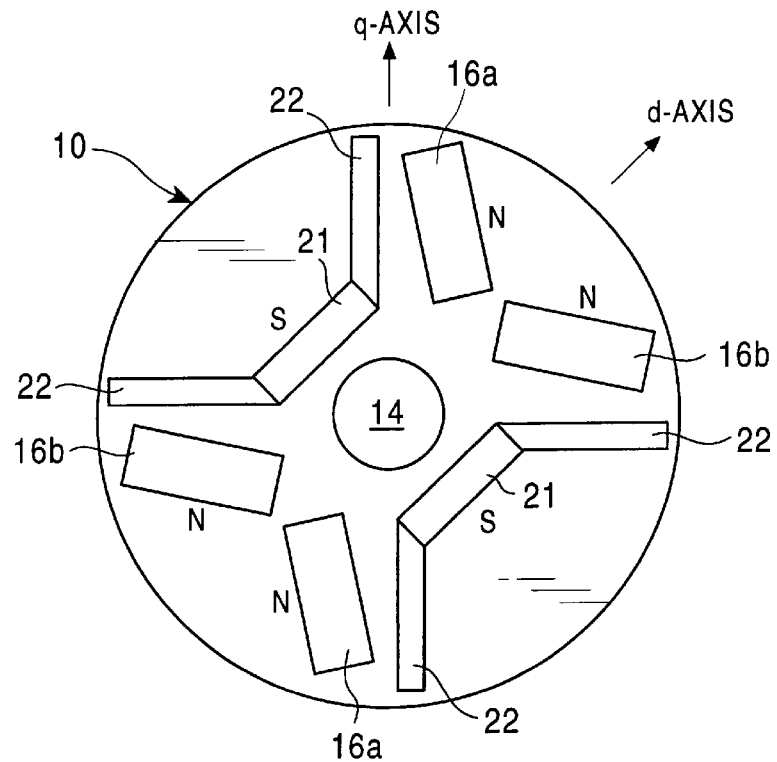
Figure 17:
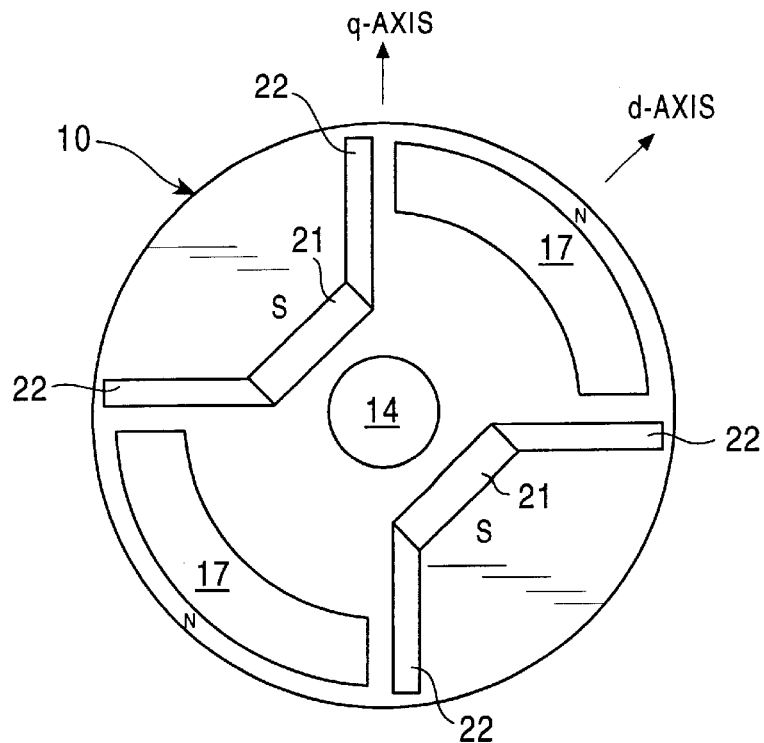
Figure 18:
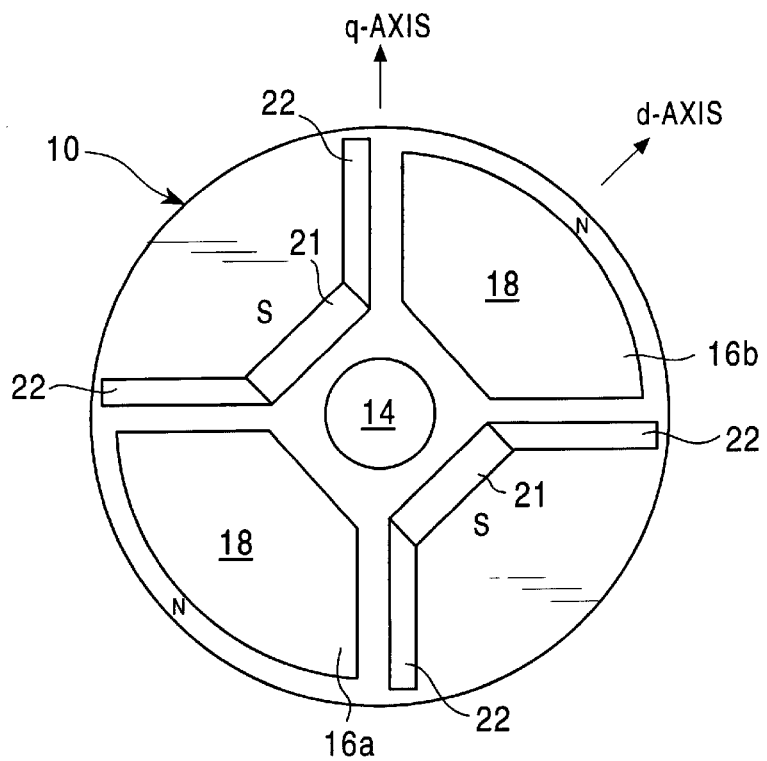
Figure 19:
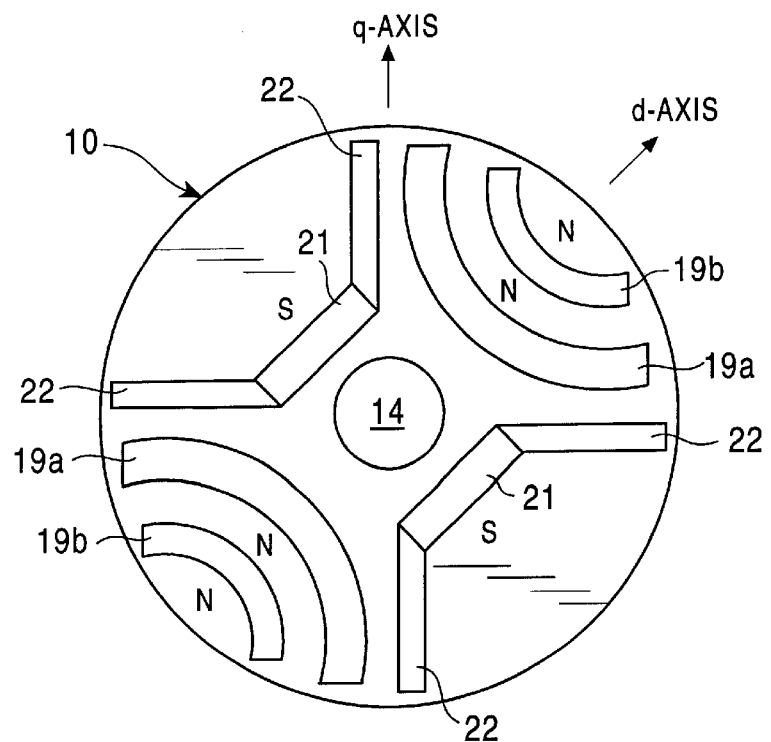
Figure 20:
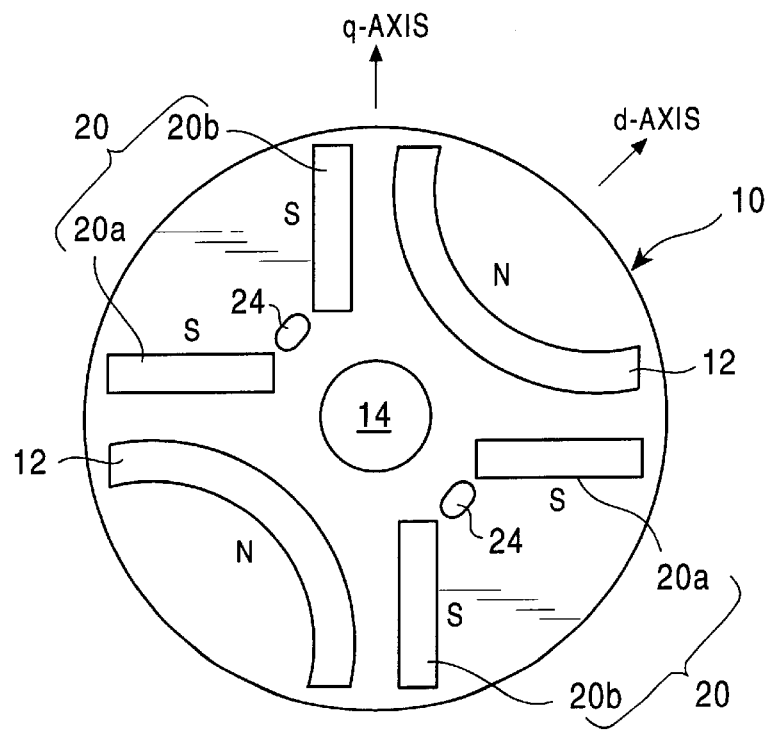
Figure 21:
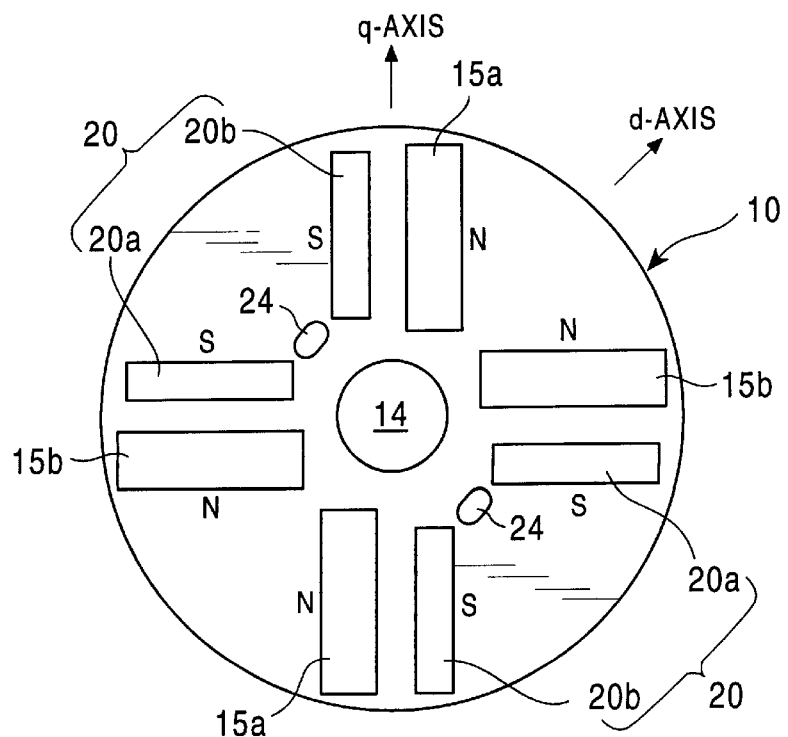
Figure 22:
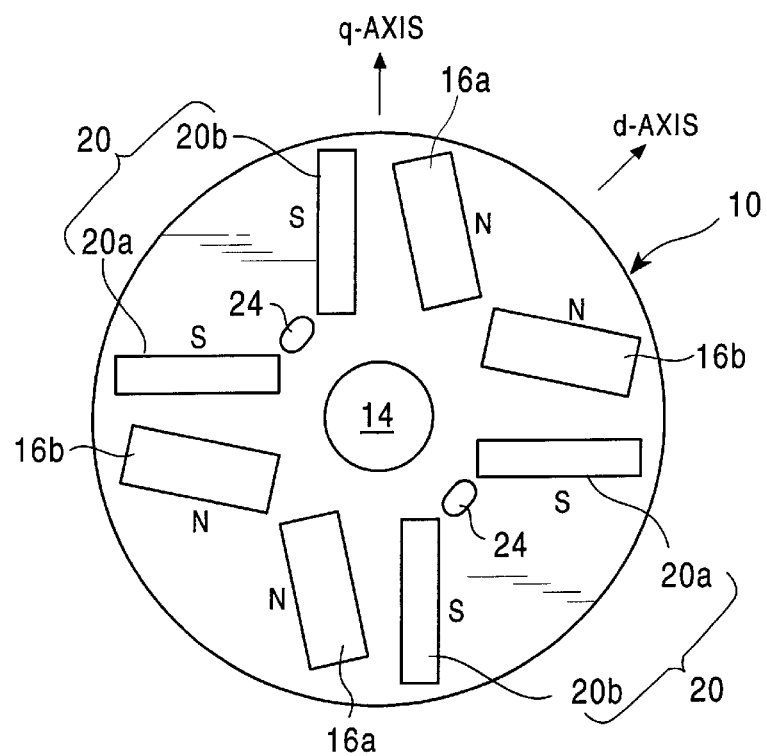
Figure 23:
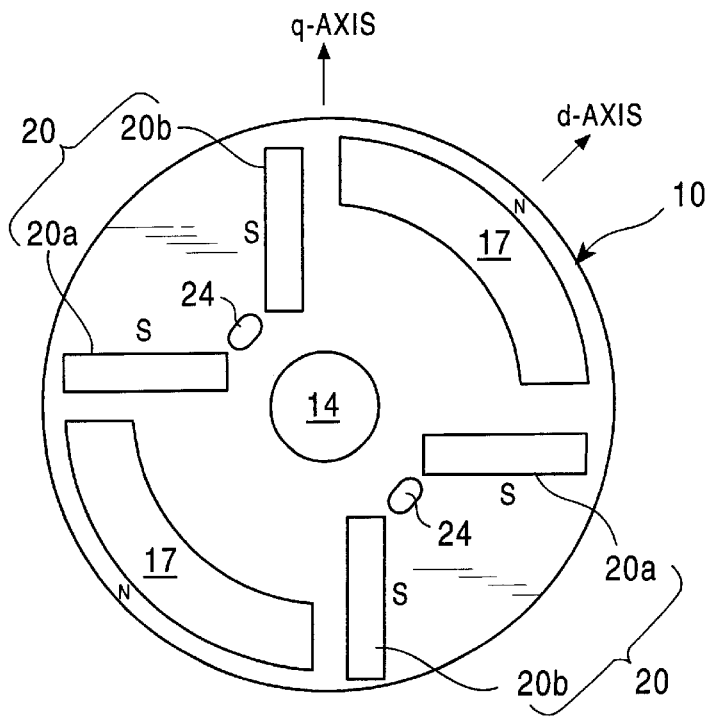
Figure 24:
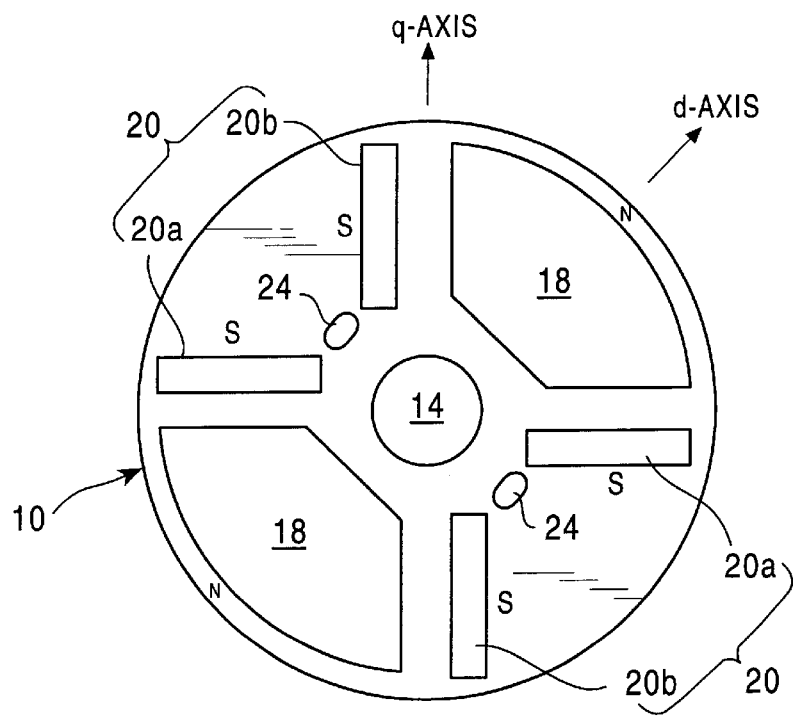
Figure 25:
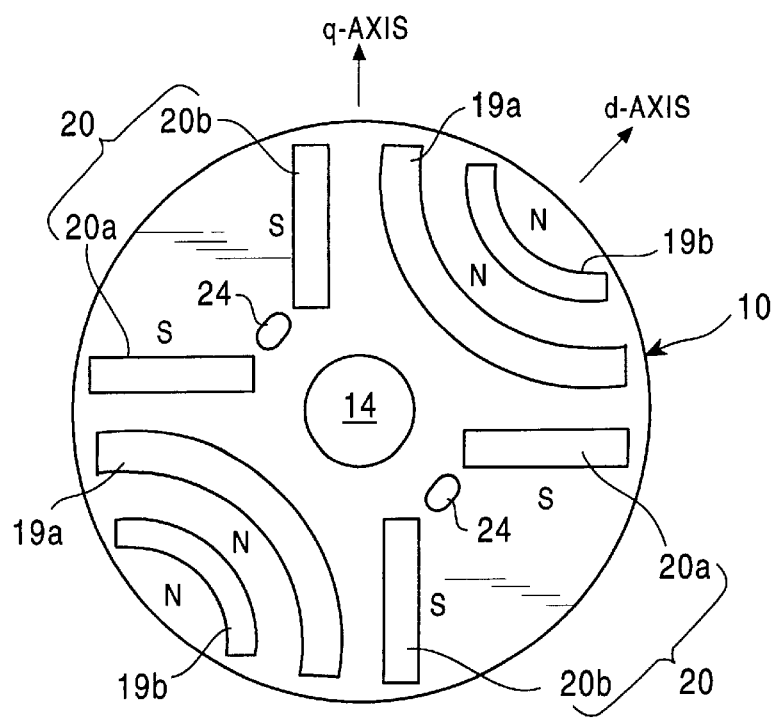

Explaining the rotor core 10 using the case in FIG. 14 as an example, the magnetic flux density is smaller than that of the corresponding rotor core 10 shown in FIG. 8, but the q-axis inductance remains large, therefore the reluctance torque is further increased. And the cost reduces as the amount of rare-earth magnet used is decreased. The rotor cores 10 shown in FIG. 15 to FIG. 19 have the same effects, as well.

In each modification shown in FIG. 8 to FIG. 13, as the first permanent magnet of the south pole, the first permanent magnet 20 having two magnet pieces 20*a* and 20*b* made of the rare-earth magnet is used. It is also preferable that a hole 24 for flux barrier be formed between the end portions of the magnet pieces 20*a* and 20*b* in the central portion of the rotor core, as shown in FIG. 20 to FIG. 25 as other modifications corresponding to FIG. 8 to FIG. 13 respectively.

Although the present invention has been shown and described with respect to best mode embodiments thereof, those skilled in the art understanding the subject-matter of the present invention should readily think out other changes, variations, and equivalency thereof, so that the scope of the present invention should be within the scope of the accompanying claims and the equivalencies thereof.

What is claimed is:

1. An electric motor with a permanent magnet rotor, comprising:

a stator core for generating a rotation magnetic field, and a rotor core rotationally disposed in the stator core and including at least one pair of first permanent magnets to form magnetic poles and symmetrically arranged with respect to a center of a band plate having a rectangular cross-setion with a first side extending along the rotor core and a second side extending perpendicularly to the first side, and made of one of a rare-earth magnet and a ferrite magnet, said band plates of the first permanent magnets being arranged so that the second sides orient perpendicular to a diametric line passing through the center of the rotor core and being disposed near an outer periphery of the rotor core parallel to each other in the first and second sides, respectively; and at least one pair of second permanent magnets formed of the other of the rare-earth magnet and the ferrite magnet to form magnetic poles, each of the second permanent magnets being formed of a band plate with an arc-shaped cross-section and situated between the first permanent magnets.

2. The permanent magnet rotor type electric motor according to claim 1, wherein each of the second permanent magnets extends from a portion near the outer periphery of the rotor core toward the center thereof and is curved continuously throughout an entire length thereof to form a convex face orienting inwardly, the convex face and concave face of the second permanent magnet having different magnetic poles, and radially inner and outer faces of the first permanent magnet having different magnetic poles.

3. The electric motor with the permanent magnet rotor according to claim 1, wherein the second permanent magnet is disposed so that a convex face thereof having the arc-shaped cross-section is oriented toward the center of the rotor core.

4. The permanent magnet rotor type electric motor according to claim 1, wherein the second permanent magnet is disposed so that a convex face thereof having the arc-shaped cross-section is oriented toward an outer circumference of the rotor core.

5. The permanent magnet rotor type electric motor according to claim 1, wherein each of the second permanent magnets has a plurality of magnet pieces which is formed of a band plate having the arc-shaped cross-section and concentrically arranged, and has a different length of a arc portion from each other.

* * * * *